Feb. 9, 1960  P. STARTZELL  2,924,045
GLASS BENDING MOLD
Filed March 1, 1957
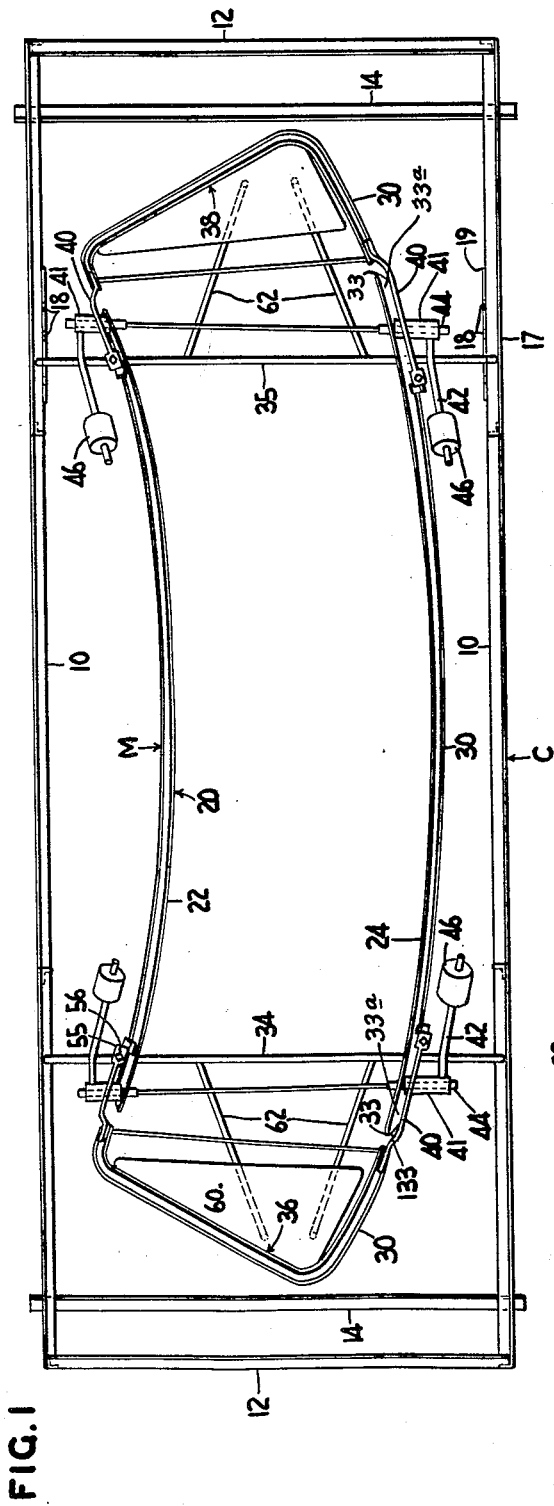
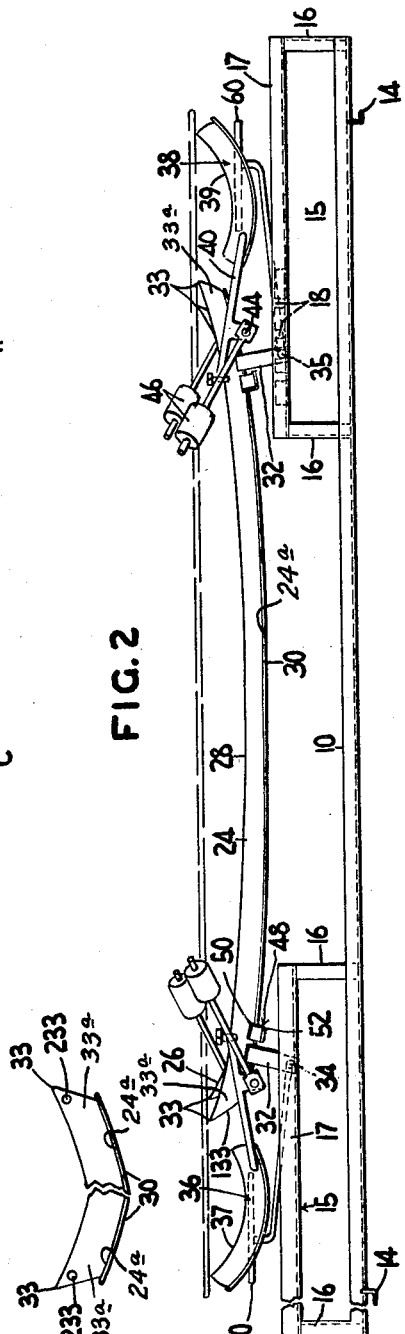
FIG. 1
FIG. 2
FIG. 3
INVENTOR.
PAUL STARTZELL
BY
Oscar L. Spencer
ATTORNEY

United States Patent Office 2,924,045
Patented Feb. 9, 1960

2,924,045

GLASS BENDING MOLD

Paul Startzell, Greensburg, Pa., assignor to Pittsburgh Plate Glass Company, Allegheny County, Pa., a corporation of Pennsylvania Application March 1, 1957, Serial No. 643,341

4 Claims. (Cl. 49—67)

This application relates to improvements in treating glass and particularly concerns improvements in molds for bending glass sheets to bending curves of varying radius including a relatively gently bent central portion merging into flanking regions that are sharply bent.

In bending glass sheets to such complex bending curves, bending techniques have been developed which involve the use of sectionalized molds of skeleton configuration conforming in elevation and outline to the shape of the curved glass sheet. The most effective molds of this type are concave in elevation and include a rigid, central molding member comprising spaced rails, flanked by pivotable wing members comprising reversely curved rails. The wing members rotate into a spread mold position to support the flat glass sheet as a beam adjacent its longitudinal extremities and at some intermediate point or points, preferably the ends of the center molding member rails. The wing members are preferably counterweighted to rotate upwardly.

According to present commercial practice, such glass laden molds are successively conveyed laterally through a tunnel-like bending lehr. In the lehr, the molds are first conveyed through a preheat zone where they are exposed to successive regions of increasing but uniform temperatures, until they reach a temperature just below the glass softening point, then exposed to a temperature pattern having spaced regions of relatively high temperature that are in close proximity to the ends of the center section mold rails within a bending zone. This latter temperature configuration is necessary because portions of the glass sheets to be bent sharply must pass through the spaced regions of relatively high temperature.

When glass laden molds are subjected to glass softening temperatures, the central portions of the glass sheets sag to conform to the upper shaping surfaces of the center molding member rails, while the wing members rotate into a closed mold position to form a substantially continuous frame conforming in elevation and contour to the shape desired for the bent glass, thus lifting the heat softened glass sheet extremities from flat to curved configuration.

Since metal and glass have different thermal capacities, the portions of the glass resting on the ends of the center section rails are stressed because of the different rates with which the metal and the glass temperatures rise upon exposure to elevated temperatures during the bending cycle. This phenomenon is especially true when the intermediate support points traverse the bending zone through or near the high temperature regions.

Before the present invention, a large number of bent glass sheets had to be scrapped because of glass breakage in the vicinity of the intermediate support points. For many years these losses were accepted as inherent in the commercial bending operation. Only recently was the cause of this breakage associated with the difference in thermal capacity between the metal and the glass, resulting in steep temperature gradients between the portions of the supported glass sheets contacting the mold rails and their adjacent portions.

According to the present invention, the thermal capacity per unit length of the mold has been reduced at the ends of the center section mold rails in order to minimize the temperature gradients between the glass portions contacting the metal mold and their adjacent portions. This objective has been accomplished, according to the present invention, by undercutting the ends of the mold rails in order to minimize their height at their ends, by drilling apertures through the rails adjacent their ends, or by a combination of both expedients.

The present invention will be understood better after reading a description of a particular embodiment thereof which follows. In the drawings forming part of the description of the illustrative embodiment, wherein like reference numerals refer to identical structural elements throughout, Figure 1 represents a plan view of a sectionalized bending mold constructed according to the teachings of the present invention.

Figure 2 is an elevational view, partially in perspective, showing the bending mold of Figure 1 in open position for supporting flat glass sheets for bending.

Figure 3 is a fragmentary elevational view of the ends of a center mold section rail illustrating an alternate embodiment of the present invention.

Referring to the drawings, reference character M refers generally to a bending mold and reference character C refers to a carriage which is used to carry the bending mold through a tunnel-like lehr where the temperature of glass sheets is gradually increased until the glass reaches the glass softening temperature.

Carriage C comprises a pair of longitudinally extending L-beams 10 interconnected at their ends by cross beams 12. Cross rails 14 also interconnect the longitudinally extending L-beams 10 and extend beyond the sides of the carriage to provide spaced slides which ride on top of conveyor rolls (not shown) when the carriage and mold supporting a glass sheet for bending are conveyed laterally through a bending lehr.

A superstructure 15 is carried by support posts 16 at each side of each longitudinal extremity of the carriage. Each superstructure 15 includes a horizontally disposed angle iron 17, the flanges of which are located on the outboard side and the underside of the superstructure. The laterally opposing angle irons 17 at one end of the carriage support an attached bar cut with notches 18.

Bending mold M comprises a center molding section 20 including spaced rails 22 and 24 extending longitudinally of the mold. Rail 22 has an upper shaping top surface 26 (Figure 2) and rail 24 has an upper shaping top surface 28 conforming to the shape desired for the sides of the central portion of the bent glass sheets. The rails 22 and 24 are reinforced by reinforcement strips 30 attached to the bottom surfaces thereof, as shown at 24a in Figure 2.

Braces 32 extend obliquely downwardly from adjacent the glass-supporting, transversely extending end edge extremities 33 of the end portions 33a of the side rails 22 and 24 which end edge extremities each lie in the top surfaces of the side rails. The side rails, therefore, each have end portions 33a; and, therebetween, an intermediate portion of substantially uniform height, as shown in Figure 2. The braces terminate at their bottom ends in cross bars 34 or 35 to which they are attached. Cross bars 34 rest slidably on the horizontal flanges of the smooth angle iron 17 and cross bars 35 fit in one of the pairs of opposed notches 18 in the notched bar 19 attached to the right hand angle irons 17. Thus, the mold M is supported in spaced relation above the carriage C.

Flanking the outboard transversely extending end edge extremities 33 of the center mold rails 22 and 24 are wing members 36 and 38, respectively, having upper shaping surfaces 37 and 39, respectively. These wing members each are attached at their inboard extremities to curved straps 40. The latter are rigidly connected to counterweighted arms 42 through sleeves 41, each of which rotates about a pivot rod 44 with its associated strap and wing member. The pivot rods 44 are attached in fixed relation to the center mold section 20.

Counterweights 46 are attached to the inboard extremities of the counterweighted arms 42. These latter are of such a size as to force the wing members 36 and 38 to be rotated upwardly whenever the supported unbent glass has softened sufficiently to permit its tips to flex in response to bending moments applied about the pivots 44. Reinforcement bars 30 may also be attached to the bottom of wing members 36 and 38 to improve their structural rigidity.

Conventional stop members 48 are attached to the mold rails 22 and 24 inboard of the pivot rods 44 to stop the rotation of the wing members 36 and 38 when the latter have rotated into the desired closed mold position. Upper shaping surfaces 26, 28, 37 and 39 define a substantially continuous frame conforming in elevation and outline to the shape desired for the bent glass sheet in the closed mold position.

Each stop member 48 comprises a depending flange 50 attached at its upper extremity to a mold rail 22 or 24 and terminating at its bottom extremity in a horizontal flange 52. At the inboard extremity of each strap 40 there is an apertured enlargement 55 through which a set screw 56 is threaded. When the wing members 36 and 38 have rotated into the closed mold position, the bottom of set screw 56 engages the horizontally extending flange 52 of stop member 48, thus inhibiting further inboard rotation.

At each longitudinal extremity of the bending mold M, a heat abstractor 60 is located to insure that the extremities of the glass sheet are kept flat while the severely bent portions are being bent. The heat abstractors 60 are supported by support rods 62 which interconnect the heat abstractor plates 60 to the cross rods 34 or 35.

The gist of the present invention resides in minimizing the thermal capacity per unit length of the center mold section rails 22 and 24 at their end portions 33a. In the embodiment of Figure 2, this is accomplished by undercutting the end portions 33a at 133, thus tapering or converging the bottom surfaces of the side rails toward the top surfaces thereof as is shown in Figure 2 by the bottom surfaces 133 which are converged toward the top surface 28, to decrease the height of the end portions from that of the intermediate portions of the center section mold rails 22 and 24 toward the end edges 33 of the end portions 33a. In Figure 3, this objective is attained by drilling apertures 233 near the transversely extending end edge extremities 33 of the end portions 33a of the center section rails.

The reduced thermal capacity per unit length of the mold in the vicinity of the intermediate support points for the flat glass provided by the rail end portions 33a and the transversely extending end edges 33 thereof enables the thermal gradients in the vicinity of the supported points of the flat glass sheet to be reduced by thermal conduction sufficiently rapidly so that the thermal gradients are not so steep as to cause thermal shock.

With respect to the Figure 3 modification, it is understood that it has been the custom to drill spaced apertures throughout the entire length of rails used to bend and temper glass sheets. This particular embodiment of the present invention is distinguished over such tempering molds in the limitation of the apertures to the vicinity of the rail ends.

It is understood that the thermal capacity per unit length of the mold may be reduced in the vicinity of the intermediate flat glass support points by a combination of the methods disclosed in Figures 2 and 3.

What is claimed is:

1. A sectionalized glass bending mold of the concave skeleton type comprising a center molding member including spaced rails having top and bottom surfaces, said rails each having end portions terminating in transversely extending glass-supporting end edges lying in the top surfaces of said rails, and an intermediate portion of substantially uniform height between the end portions of each rail, said rails each having the bottom surface thereof in each end portion converged toward the upper surface of the rail in each end portion to provide end portions of a height that decreases from the height of the intermediate portion toward the edge thereof, said glass-supporting end edges all being disposed in a common plane, end molding members having outboard extremities, said end molding members being rotatable relative to the center molding member into a spread position wherein their outboard extremities lie in said common plane so that a flat sheet of glass may be supported by said outboard extremities and each of said end edges of the end portions of said spaced rails, said end molding members being also rotatable into a closed position to define with said center molding member a substantially continuous frame conforming in elevation and outline to the shape desired for the bent glass sheet, the intermediate portion of each of said spaced rails thereby having a high thermal capacity per unit length and said end portions each having a lower thermal capacity per unit length than that of said intermediate portion therebetween, whereby the heat transmission between said end edges and the glass sheet in contact therewith is reduced and the temperature gradient between the portions of said supported glass sheet at said points of contact with said end edges and the portions of said supported glass sheet adjacent thereto is reduced.

2. The mold according to claim 1 wherein said rails each have the bottom surface converged upwardly in each end portion to meet the upper surface in a straight line to provide said transversely extending glass-supporting end edges.

3. The mold according to claim 2 wherein the upwardly converged bottom surface of said side rails in each end portion thereof is a straight surface and provides a tapered end portion.

4. The mold according to claim 1 wherein the intermediate portions of said side rails are solid and each end portion is provided with an aperture adjacent said transversely extending end edge.

References Cited in the file of this patent

UNITED STATES PATENTS

| | | |
|---|---|---|
| 2,297,315 | Owen | Sept. 29, 1942 |
| 2,327,883 | Gaiey | Aug. 24, 1943 |
| 2,408,526 | Minton | Oct. 1, 1946 |
| 2,691,854 | Rugg | Oct. 19, 1954 |
| 2,737,758 | Jendrisak | Mar. 13, 1956 |
| 2,774,189 | Jendrisak | Dec. 18, 1956 |

FOREIGN PATENTS

| | | |
|---|---|---|
| 1,089,973 | France | Oct. 13, 1954 |